United States Patent [19]

Porter

[11] Patent Number: 4,854,534
[45] Date of Patent: Aug. 8, 1989

[54] TOP RELEASE PLATFORM BRACKET

[76] Inventor: Stuart J. Porter, 2181 Mill Rd., Novato, Calif. 94947

[21] Appl. No.: 196,955

[22] Filed: May 20, 1988

[51] Int. Cl.$^4$ ............................................. E04G 5/06
[52] U.S. Cl. ............................... 248/222.1; 114/362; 248/235
[58] Field of Search .............. 248/235, 247, 222.1, 248/222.2, 222.3, 225.1, 225.2; 108/152; 211/90; 182/55, 53, 150, 187; 114/343, 362, 364

[56] References Cited

U.S. PATENT DOCUMENTS

| | | | |
|---|---|---|---|
| 2,542,696 | 2/1951 | Nelson | 248/289.1 |
| 2,717,802 | 9/1955 | Martin | 248/289.1 X |
| 3,195,680 | 7/1965 | Thornburg | 114/364 X |
| 3,404,212 | 10/1968 | Mack et al. | 248/289.1 X |
| 3,613,137 | 10/1971 | Eccles | 114/362 |
| 3,630,473 | 12/1971 | Landis | 248/222.2 X |
| 3,695,568 | 10/1972 | Hogrebe | 248/222.2 |
| 4,085,473 | 4/1978 | Franklin | 114/364 |
| 4,719,989 | 1/1988 | Ritten | 114/362 X |
| 4,726,317 | 2/1988 | Ritten | 114/362 |

Primary Examiner—J. Franklin Foss
Attorney, Agent, or Firm—Larry D. Johnson

[57] ABSTRACT

A top release platform bracket utilizes a two-piece construction that provides secure attachment and quick removal of a swim board to a boat transom. One piece of the platform bracket is a wall portion that bolts directly to the boat transom with through-bolts. This wall portion includes a transom plate for attachment to the transom, and an upper and a lower flange member secured to the transom plate so that the flanges are oriented generally horizontally when the transom plate is bolted to the transom. The other piece of the platform bracket is a separate shelf portion, which screws directly to the swim board itself. The shelf portion includes a horizontal support plate for attachment to the swim board; a vertical support member, which is mounted to the horizontal support plate at an angle so that the plane of the swim board will be parallel to the water's surface; and, if necessary, a brace member triangulating the two. The vertical support member of the shelf portion includes a base that is sized to engage a connector in the lower flange member of the wall portion. A self-locking pin or other locking mechanism fits through complementary holes in the upper flange member of the wall portion and the horizontal support plate of the shelf portion to lock the two in place, thereby securing the swim board to the boat.

4 Claims, 2 Drawing Sheets

TOP RELEASE PLATFORM BRACKET

BACKGROUND OF THE INVENTION

1. Field of the Invention

This invention relates generally to hardware and support apparatus, and more specifically to an improved bracket device for supporting a swimboard from a boat.

2. Description of the Prior Art

Many small boats are equipped with a wooden or plastic platform or swim board, typically bolted to the boat's transom, to assist swimmers and skiers into and out of the boat. Because of the significant stresses that can be applied to such a swim board due to passenger loading and unloading, as well as due to the contact with the water when the boat is underway, it is imperative that the swim board be securely fastened to the boat. Accordingly, many swim boards are simply (and essentially permanently) bolted to the transom. However, such attachment makes it difficult to remove the swim board from the boat when desired. Other swimboards utilize brackets which incorporate some form of release device to simplify the removal of the swim board from the boat, but these release devices regularly jam or break due to the applied stresses, or are located in an awkward or inaccessible area, making release difficult. Other existing brackets enable removal of the swim board only in a vertical direction, thus restricting the placement of cleats, eyes, or other structural protuberances on the transom above the swim board.

SUMMARY OF THE INVENTION

The improved top release platform bracket of this invention utilizes a two-piece construction that provides secure attachment of a swim board to a boat transom, while permitting quick and easy removal of the swim board from the boat when desired. One piece of the platform bracket is a wall portion that bolts directly to the boat transom with through-bolts. This wall portion includes a transom plate for attachment to the transom, and an upper and a lower flange member secured to the transom plate so that the flanges are oriented generally horizontally when the transom plate is bolted to the transom. The other piece of the platform bracket is a separate shelf portion, which screws directly to the swim board itself. The shelf portion includes a horizontal support plate for attachment to the swim board; a vertical support member, which is mounted to the horizontal support plate at an angle so that the plane of the installed swim board will be parallel to the water's surface; and, if necessary, a brace member triangulating the two. The vertical support member of the shelf portion includes a base that is configured to engage a connector in the lower flange member of the wall portion. A self-locking pin or other locking mechanism fits through complementary holes in the upper flange member of the wall portion and the horizontal support plate of the shelf portion to align and lock the two in place, thereby securing the swim board to the boat. Thus, the swim board can be easily removed from the boat after installation by simply removing the pin, tilting the shelf portion away from engagement with the wall portion, and lifting the swim board away from the fixed transom.

The advantages of such a top-release configuration include the fact that the locking pin is readily accessible from the boat itself, and is not hidden below the platform. In addition, this configuration enables the platform to be moved generally horizontally away from the transom for removal, and thus does not require any clearance on the transom above the platform. Thus cleats, screw eyes, or other hardware can be installed on the transom without interfering with swim platform installation or removal.

This improved bracket can be modified, if necessary, to fit practically any size and type of boat. For example, it is of course desirable to mount the swim board parallel to the water's surface. Because of the variation in the angle of different boat's transoms, it may be necessary to adjust the angle between the horizontal support plate and vertical support member so that the horizontal support plate, and thus the swim board, is parallel to the water. It has been found that an angle of between 80 and 140 degrees (relative to the transom) may be necessary for particular applications. Furthermore, this platform bracket can be used with non-planar (e.g., curved) transoms, by appropriate repositioning of the right-left orientation of the horizontal support plate relative to the vertical support member.

This improved bracket is suitable not only as original equipment on a boat, but also as an aftermarket item to add a swim board to a boat, or to replace existing brackets on a boat already equipped with a swim board. In replacement applications, it is suggested that the bolt holes in the transom plate be made in the existing size and spacing of the original bracket, and that the same size through-bolts be used there. However, the screw holes in the horizontal support plate should preferably not be placed in the existing positions, so that new and stronger screw holes can be placed into the wood or plastic of the swim board.

DETAILED DESCRIPTION OF A PREFERRED EMBODIMENT

Figure 1:
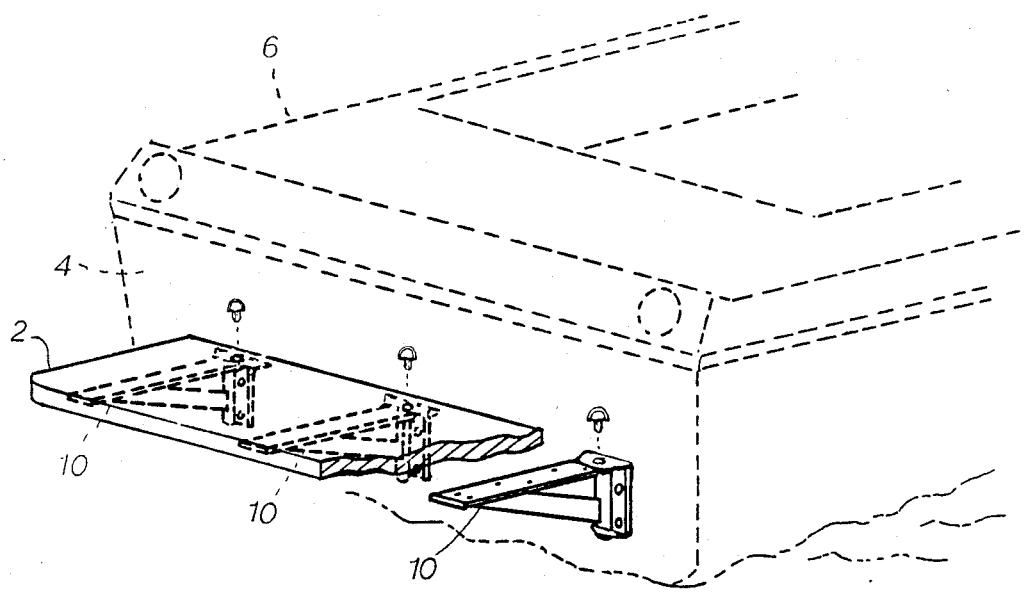
FIG. 1 is a partially cutaway perspective view of a series of three top release platform brackets of this invention as used to mount a swim board to the transom of a boat.

FIG. 1 illustrates a partially cutaway perspective view of a typical application of the platform bracket of this invention. In FIG. 1, a swim board 2 is attached to a transom 4 of a boat 6 by means of a series of three platform brackets 10. As can be appreciated from this illustration, it is important that the swim board be securely attached to the boat, and further that the swim board should be mounted so that its plane is parallel to the surface of the water W.

Figure 2:
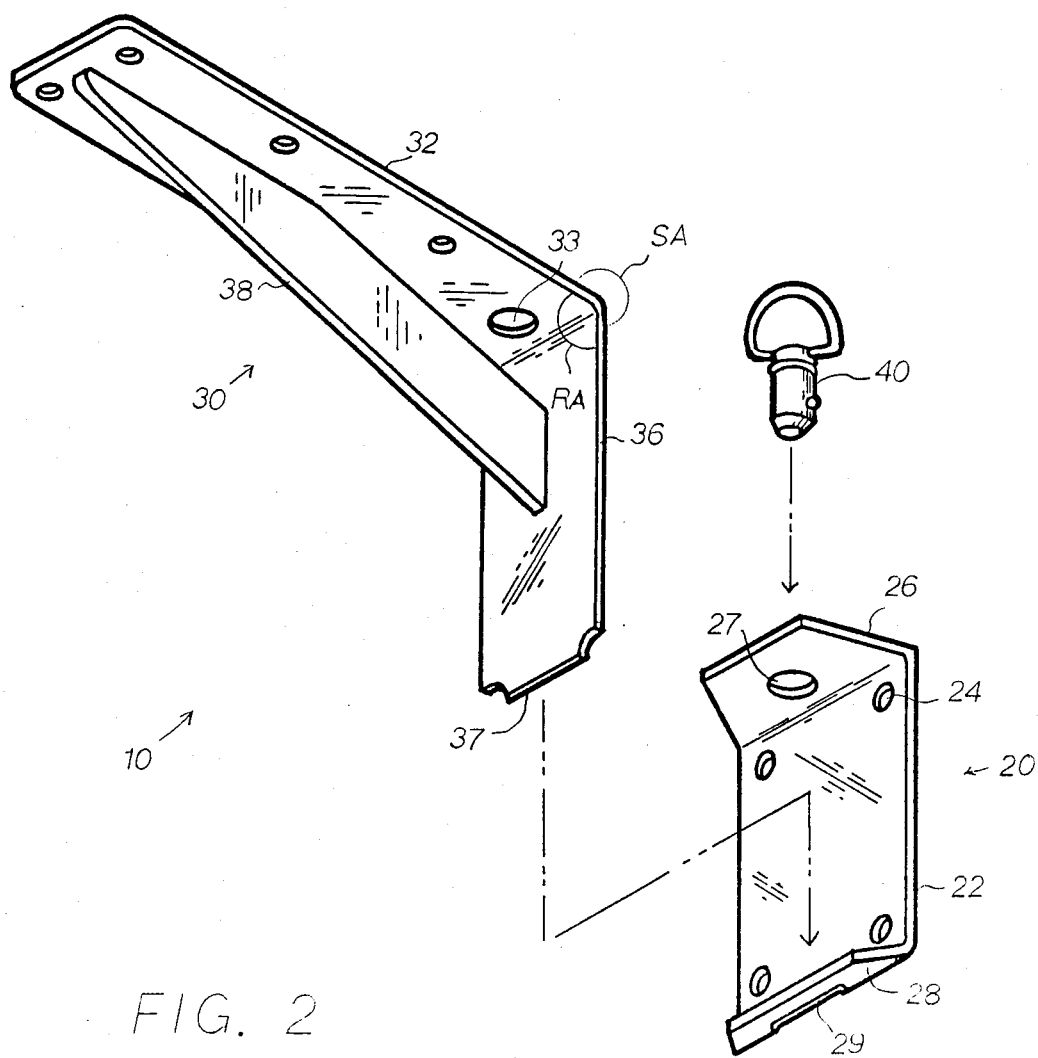
FIG. 2 is an exploded perspective view of one embodiment of a single top release platform bracket.

Referring now to FIG. 2 with greater particularity, an exploded perspective view of a single top release platform bracket 10 is shown. Platform bracket 10 comprises essentially two parts: a wall portion 20 and a shelf portion 30. Wall portion 20 includes a transom plate 22, which is through-bolted to the boat transom through bolt holes 24. An upper flange member 26, bearing a locking pin hole 27, and a lower flange member 28, bearing a connector portion 29, (here, a receiver or milled slot) each extend generally perpendicularly out and away from transom plate 22.

Shelf portion 30 includes a horizontal support plate 32, bearing a locking pin hole 33, which attaches directly to a swim board with screws through screw holes 34. A vertical support member 36 (here, a plate) extends downward generally perpendicular to the plane of horizontal support plate 32, and terminates in a base 37. The rise angle RA between the plane of horizontal support plate 32 and the plane of vertical support member 36 can be adjusted at manufacture to accommodate various vertical angles of boat transoms (e.g., ninety degrees, ninety eight degrees, one hundred two degrees), as needed, so that the installed swim board is parallel to the water's surface. The swing angle SA between the right-left orientation of horizontal support plate 32 and the plane of vertical support member 36 can be similarly be adjusted at manufacture to accomodate various horizontal angles or curvature of boat transoms (e.g., zero degrees, eleven degrees left, eleven degrees right). A brace member 38, which can be flat bar or other common material, is installed between horizontal support plate 32 and vertical support member 36, and serves to triangulate the structure and provide increased strength to the shelf portion 30.

Once wall portion 20 has been bolted to the transom, and shelf portion 30 has been screwed to the swim board, the two components are joined by aligning base 37 of vertical support member 36 over the connector 29 of lower flange member 28, and sliding the base into the connector. A self-locking pin 40, or other locking mechanism, can then be inserted through the holes 27 and 33, respectively, to lock the two parts in place, thereby securing the swim board to the boat. Removal of the swim board from the boat is simply the reverse of the mounting process: pin 40 is removed, and shelf portion 30 is lifted off of and away from wall portion 20, leaving the boat transom relatively free from protuberances.

The entire platform bracket can be constructed of aluminum, stainless steel, or any other appropriate material. Of course, the size and capacity of the bracket can be chosen for particular applications.

Figure 3:
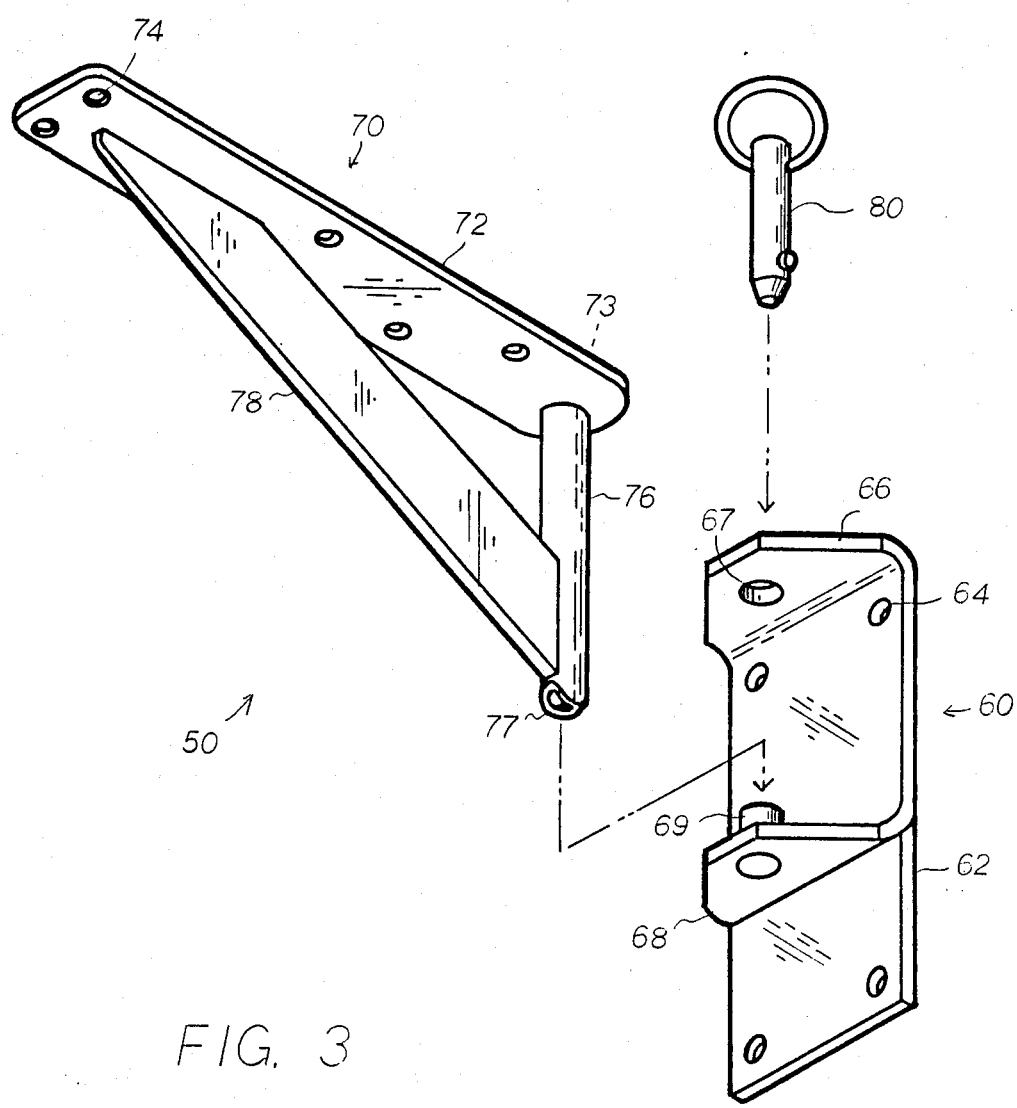
FIG. 3 is an exploded perspective view of an alternate embodiment of a single top release platform bracket of this invention.

FIG. 3 is an exploded perspective view of an alternate "universal" embodiment 50 of a top release platform bracket of this invention. Bracket 50 incorporates the same basic components as the standard bracket described supra, including wall portion 60 comprising transom plate 62, bolt holes 64, upper flange member 66 bearing pin hole 67, and lower flange member 68 bearing a connector 69 (here, a stub rod). Shelf portion 70 comprises horizontal support plate 72 bearing an aperture 73 (not visible), screw holes 74, vertical support member 76 (here, a tube) terminating in a base 77 (here, a hollow cylinder), and a brace member 78. Thus, in this embodiment, the shelf portion vertical support member comprises a tube with a hollow cylindrical base, and the wall portion lower flange member connector comprises a stub rod to engage said base. For assembly, base 77 is placed over connector 69, and shelf portion 70 is pushed into and against wall portion 60, so that selflocking pin 80 can be inserted into aligned aperture 73 and pin hole 67. This arrangement enables the bracket to swing about the vertical axis of the vertical support member, so that no fixed, built-in swing angles are necessary.

While this invention has been described in connection with preferred embodiments thereof, it is obvious that modifications and changes therein may be made by those skilled in the art to which it pertains without departing from the spirit and scope of the invention. For example, the design of this improved platform bracket can be easily modified in size and shape to accommodate virtually any application where secure attachment and easy removal of a shelf, platform or other structure is needed. Accordingly, the scope of this invention is to be limited only by the appended claims.

What is claimed as invention is:

1. A platform bracket for supporting a swim board from a boat transom, said platform bracket comprising:
    a wall portion including a transom plate member for attachment to a transom, said transom plate member having upper and lower flange members oriented generally horizontally when said transom plate member is attached to a transom, said lower flange member having a connector portion, and said upper flange member having a hole;
    a shelf portion including a support plate member for attachment to a swim board, and a vertical support member connected to said support plate member, said vertical support member having a vertical axis and a base portion configured to engage said transom plate lower flange member connector portion, and enable said shelf portion to swing about said vertical support member vertical axis, and said support plate member having a hole conditioned for alignment with said transom plate upper flange member hole; and
    a locking mechanism to engage said transom plate upper flange member hole and said support plate member hole to connect said shelf portion to said wall portion.

2. The platform bracket of claim 1 including a brace member triangulating said support plate member and said vertical support member.

3. The platform bracket of claim 1 wherein said locking mechanism comprises a self-locking pin.

4. The platform bracket of claim 1 wherein said transom plate lower flange member connector portion comprises a stub rod, and said vertical support member base portion comprises a hollow cylinder.

* * * * *